July 30, 1935.  W. S. WOOD ET AL  2,009,978
SWITCHBOARD
Filed Sept. 22, 1930    10 Sheets-Sheet 1

Inventors
W. S. WOOD
G. W. JANSON
E. A. DEMONET
By their Attorney
Eugene C. Brown

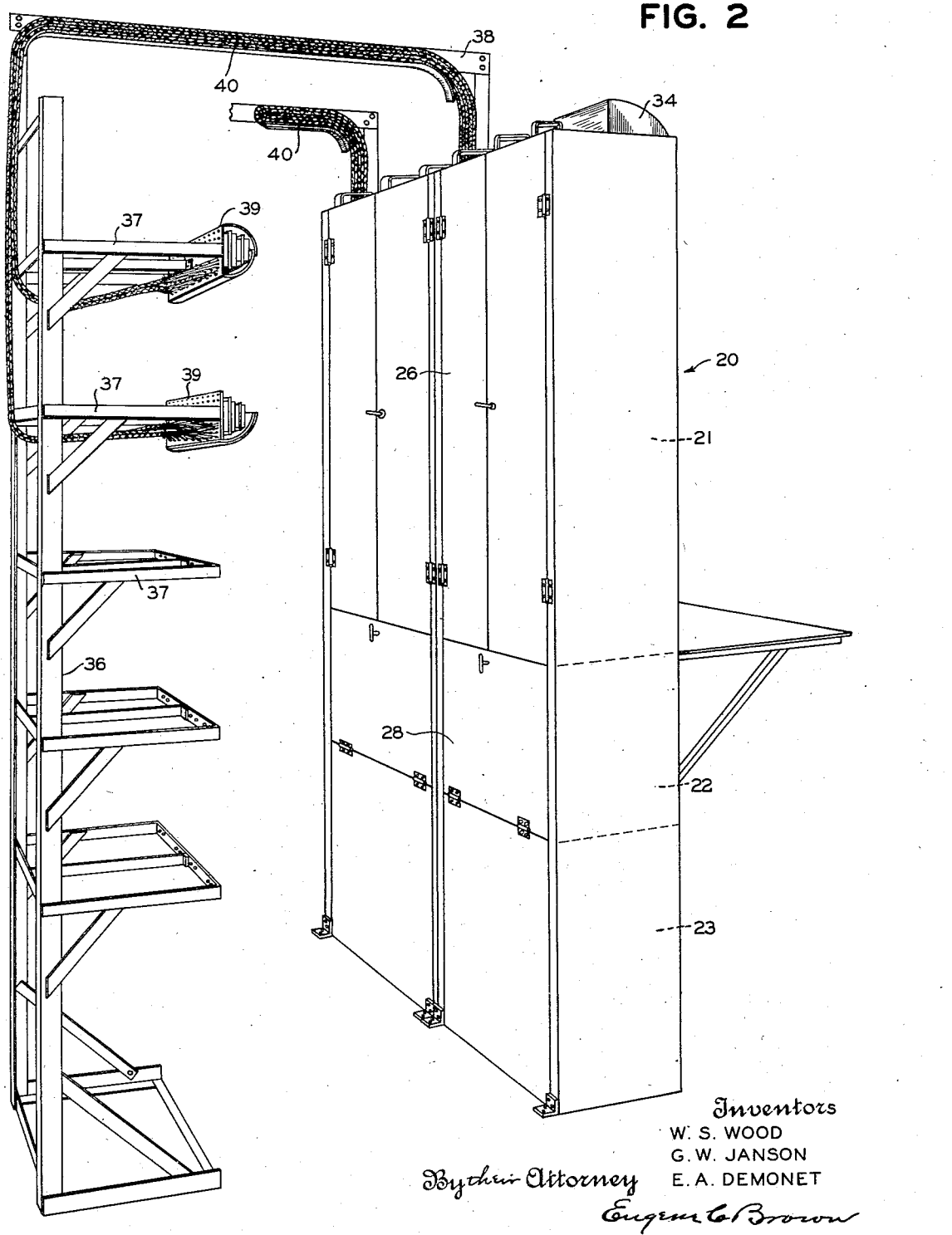

July 30, 1935. W. S. WOOD ET AL 2,009,978
SWITCHBOARD
Filed Sept. 22, 1930    10 Sheets—Sheet 3
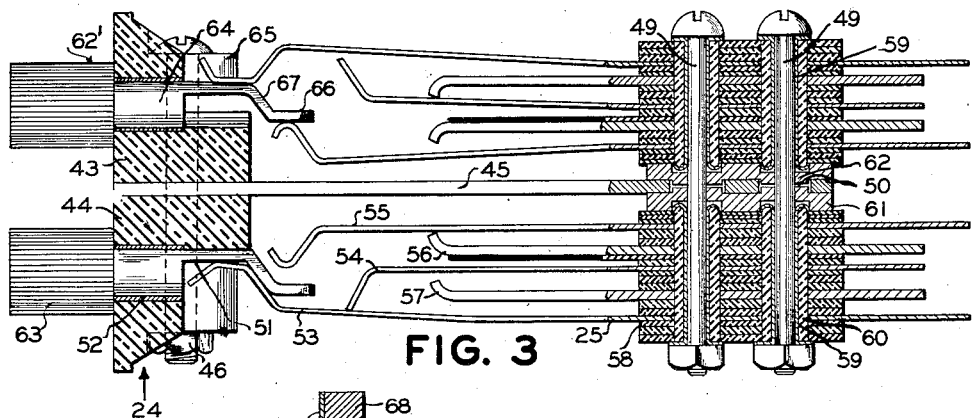
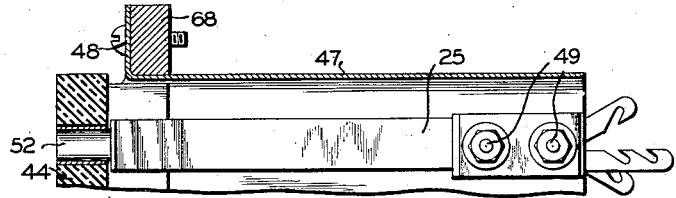
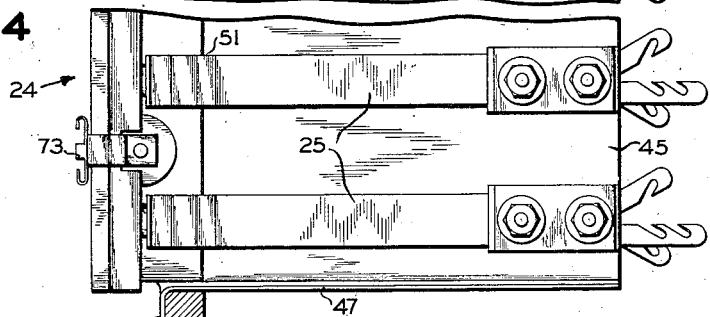
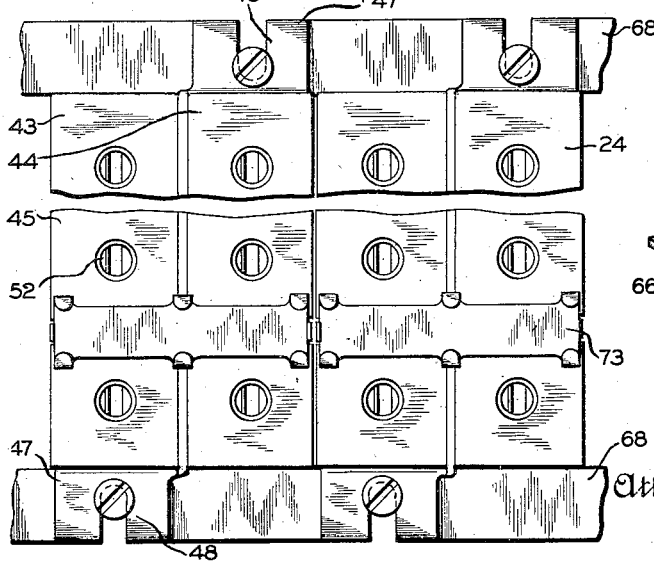
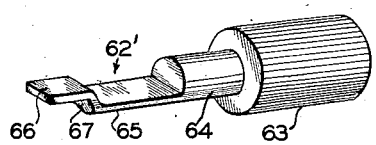
Inventors
W. S. WOOD
G. W. JANSON
E. A. DEMONET
Attorney

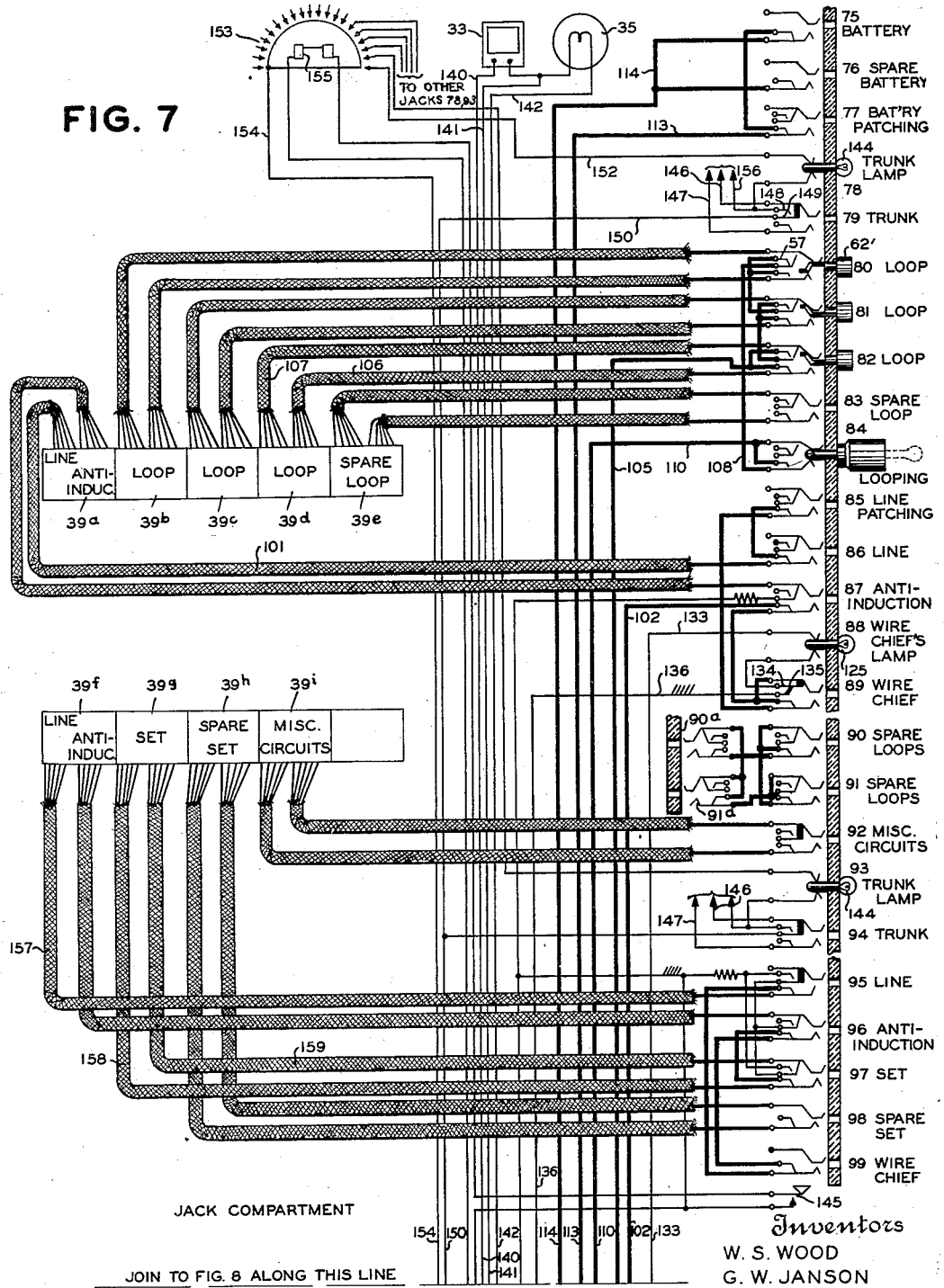

July 30, 1935.  W. S. WOOD ET AL  2,009,978
SWITCHBOARD
Filed Sept. 22, 1930   10 Sheets-Sheet 7

Inventors
W. S. WOOD
G. W. JANSON
E. A. DEMONET
By their Attorney
Eugene C. Brown July 30, 1935.  W. S. WOOD ET AL  2,009,978
SWITCHBOARD
Filed Sept. 22, 1930   10 Sheets-Sheet 10
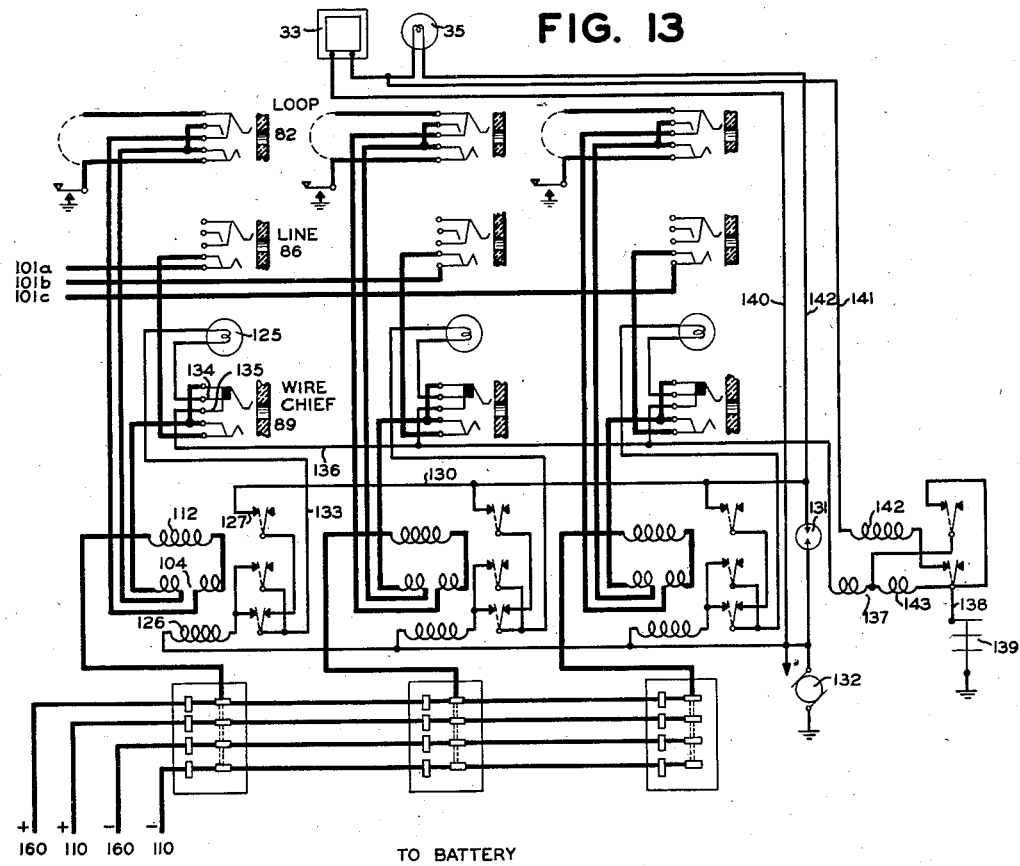
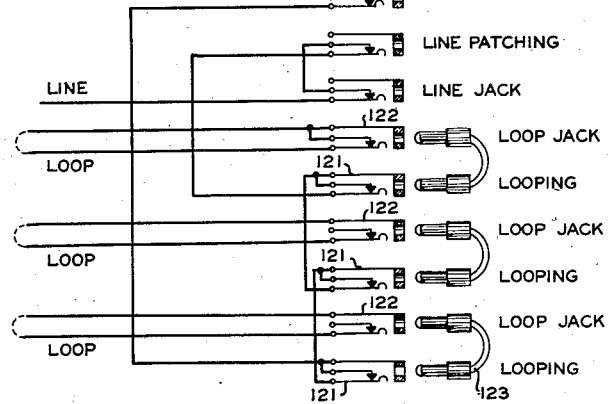
Inventors
W. S. WOOD
G. W. JANSON
E. A. DEMONET
By their Attorney
Eugene C. Brown Patented July 30, 1935

2,009,978

UNITED STATES PATENT OFFICE 2,009,978

SWITCHBOARD

Wyatt S. Wood, Bloomfield, and George W. Janson, Nutley, N. J., and Eugene A. Demonet, Brooklyn, N. Y., assignors to The Western Union Telegraph Company, New York, N. Y., a corporation of New York Application September 22, 1930, Serial No. 483,650

12 Claims. (Cl. 178—75)

This invention relates to a pin jack switchboard and distributing frame and more especially to a construction particularly applicable to telegraph circuits and equipment.

In telegraph offices a telegraph switchboard is provided having facilities for quickly and readily connecting every line wire entering the telegraph office with every other line wire entering the office. The switchboard also provides facilities for opening, grounding or applying a source of electrical potential to each line or connecting the lines to any desired receiving or transmitting apparatus. The cross connections between lines are effected by providing one or more pin or key jacks on the switchboard for each line wire, apparatus, battery or ground connection, the jacks being connected into groups termed switchboard circuits to accommodate the regular assignments of the wires or apparatus, temporary changes in the regular assignments being made by means of patching cords connected between the proper jacks.

With the possible exception of power supply and ground leads, substantially all wires leading to the ordinary telegraph switchboard are carried through a distributing frame which provides the facilities for making and changing the necessary permanent connections between the switchboard and the various main lines, loops, receiving or transmitting apparatus, anti-induction sets and the like. In order that the cable connections between the switchboard and the distributing frame may be as short as possible the distributing frame is mounted directly behind the switchboard and comprises two sides known as the horizontal side and the vertical side. All of the incoming line wires, outside loops and other conductors coming from the outside of the office terminate at the vertical side of the frame at a number of terminal blocks. The horizontal side of the frame also is provided with terminal blocks arranged in horizontal rows to one side of which all connections from the switchboard jacks are made. The connections between the terminal blocks on the horizontal and vertical sides of the frame are made by jumpers or cross connecting wires.

The connections of the incoming lines to the terminal blocks on the vertical side of the frame and the connections between the switchboard jacks and the terminal blocks on the horizontal side of the frame are of a substantially permanent nature. Changes in the normal assignments due to a change in conditions, as for example, to variations in traffic loads or if new line wires are brought into an office, are ordinarily made by changing the soldered cross connections between the blocks on the vertical and horizontal sides of the distributing frame.

Telegraph pin jack switchboards are constructed in sections of convenient width, each section having facilities for a large number of switchboard circuits. As heretofore constructed each switchboard section consists of a frame work built up of angle and strap iron on which are mounted jack panel units, resistance lamp panels and other equipment. The sections are arranged side by side in a continuous row. The distributing frames usually take one of two forms. They may consist of a rack made up of angle and strap iron built up from the floor or they may be in the form of a wall bracket also made up of strap iron. In either case the distributing frame extends as a single unit along the rear of the entire row of switchboard sections.

The pin jacks at the switchboard have usually been mounted upon rectangular panel units in a number of vertical and horizontal rows, the panel units then being assembled on the switchboard frame. A typical panel layout may comprise ten vertical rows and five horizontal rows of such rectangular panel units, each unit having sixteen jacks arranged in four horizontal and four vertical rows. The group of jacks constituting each switchboard circuit for convenience are disposed in one vertical row which may extend down across several panel units. Thus, for instance, a main line circuit involving anti-induction apparatus and three normal loop assignments may require fifteen or more jacks at the switchboard. The contact springs of these jacks are provided with a considerable number of inter-connections, which, in view of the fact that the switchboard circuits extend over a number of panel units, must be made at the rear of the switchboard after the panel units have been mounted upon the switchboard frame. With a switchboard having a number of closely spaced rows of jacks, the individual jack spring soldering lugs are not readily accessible.

Moreover, each connection between the switchboard and the distributing frame must be made after the switchboard and distributing frame have been assembled upon the floor of the switchboard room. The working space between the rear of the board and the distributing frame is made narrow to shorten the connections therebetween and the operation of making a multitude of cabled connections between the jack springs at the rear of the board and the horizontal portion of the distributing frame is tedious and time consuming.

One of the objects of the present invention is to provide a switchboard and distributing frame construction in which each switchboard section and the portion of the distributing frame associated therewith comprise an individual unit which may be assembled together and the cable connections between the switchboard and the horizontal side of the frame made in the shop or assembly room prior to the setting up of the board and frame on the switchboard floor. After the switchboard and distributing frame units have been installed side-by-side with other units in the switchboard room of a telegraph office, it is only necessary to make the cross connections between the horizontal and vertical sides of the frame and to bring the battery and ground connections to the switchboard.

This construction results in a considerable economy in the expense of assembly and installation, since the major portion of the switchboard and distributing frame wiring may be done in a single assembly room by a relatively small number of skilled workers over an extended period of time, thus reducing the expense of rush work and permitting adequate test to be made of the equipment and wiring prior to installation.

Another of the objects of the invention, therefore, is to produce such a switchboard and distributing frame unit in a shippable form, which may be delivered to telegraph offices in various parts of the country and quickly installed by a relatively small group of workmen.

Another object is to provide a switchboard section or unit in which the normal line assignments or connections to loops, office equipment, etc., may be made or interrupted without the use of patching cords but in which patching cords may be employed to make temporary changes in the assignments or to transfer circuits from one portion of the board to another.

Another object is to provide a switchboard and distributing frame construction in which the pin jacks and other switchboard equipment and cable connections are entirely enclosed and protected from dust and foreign objects and in which such equipment and connections are readily accessible for inspection, repair or alteration.

A further object is to provide a switchboard section in which the switchboard jacks, the relays and other control equipment, and the potential distributing apparatus are arranged for convenient access and in which the wiring connections between this equipment and the connections between the distributing frame and the switchboard elements is simplified and systematically arranged.

Another object is to segregate and completely isolate the potential distributing apparatus from the remaining switchboard equipment and to thereby reduce fire hazards and to arrange and construct such potential distributing apparatus so that changes in the polarity or potential of the current supplied to any circuit may be quickly made without interrupting any permanent connections.

Another object is to provide a switchboard construction in which there will be no live parts exposed either at the front of the board or at the rear thereof or at the distributing frame.

Still another object is to produce a switchboard construction which is flexible in the manner of applying different types of circuits thereto, such as main line switchboard circuits, in which the line wires are connected, loop switchboard circuits, in which are connected office loops, local connections for repeaters, etc., and city line switchboard circuits, in which are terminated the wires from the various branch offices or substations throughout a definite area served by the switchboard.

A still further object is to provide an improved arrangement at the switchboard, of the switchboard circuit jacks, trunk line jacks and signal indicating lamps and their control equipment, and to provide improved call signal, faulty line signal and busy trunk line signal systems.

Other objects and advantages will hereinafter appear.

In accordance with the present invention, each of the switchboard sections comprises a metal cabinet divided into three compartments, one for the pin jacks and the cable and cross connections thereto, the second for the relays associated with the faulty line and call signal circuits, and the third for the potential distributing apparatus for supplying the desired polarity and potential of current to the various circuits and for making changes therein. The construction and arrangement of the jacks and other equipment is such that a telegraph switchboard section of approximately one-half the width of the type previously used will accommodate approximately 50% more switchboard circuits.

Each switchboard cabinet has associated therewith a horizontal portion of distributing frame having the same width as the cabinet. Since the horizontal portion of the distributing frame takes all of the connections from the switchboard, all of the cabling may be completed in the shop at the time of assembly, and the switchboard and distributing frame collapsed for shipment and later restored to their original position when installed at an office.

The jacks are mounted upon panel units, each of which carries all of the jacks necessary for two switchboard circuits. This permits the internal wiring between the jacks to be installed prior to mounting the jack panels upon the switchboard. The wiring of the individual jack strips may be modified, of course, to care for the various circuit arrangements required at the switchboard. The specific construction of the jack panel unit is described and claimed in a copending application, Serial No. 469,131, filed July 19, 1930, and entitled "Jack panel unit", now Patent No. 1,817,738, granted Aug. 4, 1931.

The elements of the individual jacks are assembled in a variety of pile-ups prior to attachment to the panel unit and the jacks may be secured to the panel unit in different combinations, depending upon the particular circuit requirements, thus resulting in an arrangement of great flexibility. All current carrying elements of the jack, as well as the mounting means, are electrically separate from the switchboard frame and from the face of the switchboard panel. The jacks when assembled on the switchboard are entirely enclosed in a compartment of the cabinet where they are protected from damage and from dirt and foreign objects during shipment and during use. Suitable doors are provided to give ready access to the jack connections.

The jacks may be used in conjunction with a patching cord through an ordinary tip and sleeve plug or they may be employed purely as switches by the insertion of a specially shaped key which serves in one position to bridge the tip and sleeve contacts and force them apart to disengage their cooperating contacts therefrom, and in the other position to disconnect the sleeve and tip springs and permit them to move into engagement with their cooperating contacts. The key may be adjusted to either position without being removed from the jack and in each position is locked against accidental displacement. A special manipulation is required to remove the key from the jack.

The arrangement of the jack springs is such that loop assignments may be normally completed directly therethrough without the use of patching cords, the loop being shunted out of the line circuit when desired, by manipulation of the key or by insertion of a plug in the jack, the shunt path being created prior to the opening of the loop circuit. This continuity preserving feature of the jack is important, particularly in connection with circuits employing automatic printing apparatus since a signal impulse may be dropped or an extra impulse added by the momentary opening of the line circuit. This may cause faulty operation of the receiving printer. The key may also be removed and a patching cord plug inserted to connect the loop to another line without interrupting the original line circuit.

Each single line circuit terminating at the switchboard, in prior construction, has received its battery through a limiting resistance lamp arranged at the top of the switchboard and serving as a visible indication when grounds or other faults occur in the line circuit to cause an excessive flow of current. The cross connections between the distributing block and the lamp sockets are made by loose runs of wire which have to be moved whenever the normal assignments of the battery are changed, thus necessitating soldering the conductors to terminals carrying raw potential.

In the present construction this operation is rendered unnecessary, fire hazards are reduced and the unsightly appearance of the potential distributing apparatus and signal lamps is eliminated by providing the potential distributing block with a number of bus bars having different potentials and different polarities connected thereto, each bus bar being provided with terminal clips for engaging a two prong resistance unit. Insulating covers are provided for the bus bars and terminal clips so as to permit all of the live parts of the block to be enclosed, the covering means being provided with suitable apertures to permit the prongs of the resistance units to be inserted therethrough into the bus bar clips. Changes in the potential assignments of any particular line may be made by merely changing the position of the resistance unit in the cover openings.

The faulty line signal function heretofore accomplished by the resistance lamp is effected in the present construction by providing each switchboard circuit with a small individual signal lamp, preferably disposed adjacent the wire chief's jacks and a control circuit therefor so that the lamp is caused to glow in a distinctive manner, as by flashing intermittently whenever a faulty line condition occurs. The same signal lamps are also used to replace the usual differential drop employed at the board for signalling the wire chief or switchboard attendant from one of the operation positions, a control circuit being arranged to cause the lamps associated with the circuit, over which the signal is transmitted, to glow steadily to register a call.

Each section of the switchboard is also provided with an audible signal such as a buzzer and a visible signal such as a lamp of greater intensity than the individual circuit signal lamps to indicate the particular section at which the call signal or faulty line condition is registered.

The signal circuits, after they have once been completed, can only be interrupted by the wire chief coming in on the line with his test set to answer the call.

The faulty line and call signal system employs, for each line circuit, a differential relay responding to the call signals and non-responsive to faulty line conditions, a neutral relay responsive to faulty line conditions only and a locking relay. Two relays are also provided for each switchboard section for controlling the section signal devices. These relays are grouped together in the relay compartment of the cabinet. The wire connections between the relay compartment, potential distributing compartment and the jack or switchboard circuit compartment are cabled and extended in compact form upwardly along one side of the switchboard and fanned to the proper jacks in one direction as from left to right, as viewed from the rear of the board. The connections from the horizontal side of the distributing frame to the switchboard are cabled and extend downwardly along the opposite side of the switchboard and are fanned to the appropriate jacks in the opposite direction, that is, from right to left. This arrangement enables the multitudinous cable connections to be made in an orderly and systematic manner and promotes the installation, inspection, testing, repair and alteration of the circuits.

In order to extend or transfer circuits from one portion of the board to another not readily reached by the standard lengths of patching cords, multiple trunk lines are provided. Each trunk line has a jack located at each section or each alternate section of the board, a typical switchboard having from twenty to forty trunk jacks appearing at each section. Circuits may be extended from one part of the board to another by connecting the circuit to any one of the trunk lines not already in use by a patching cord and continuing the circuit at the other part of the board from the trunk line to the new circuit by another patching cord. Large telegraph switchboards may employ eighty or more of such trunk lines.

In place of the usual busy test knob provided for each trunk jack which in prior systems must be individually tapped to locate an idle trunk, a signal lamp is provided adjacent each trunk line, such lamps being connected through the contacts of the trunk jacks so that the circuit for every lamp associated with a particular trunk line is partially prepared whenever a patching cord plug is inserted in any jack of that particular trunk. The busy trunk lamp circuits for each section are connected in multiple at the opposite side of the lamp to a common switch controlled at will by the switchboard attendant to cause all of the lamps corresponding to busy trunk lines to glow at any particular section, thus visibly indicating simultaneously which trunk lines are busy and which are idle and thus available for use.

The cable conductors are preferably terminated at the horizontal and vertical sides of the distributing frame in terminal blocks of the type shown in a copending application of L. H. Rovere and E. V. Mott, Serial No. 438,481, filed March 24, 1930, and entitled "Switchboard terminal block". This block provides a multitude of terminals disposed within a small space, whereby the horizontal portion of the distributing frame associated with each switchboard section may be made of a width not greater than that of the switchboard section. The terminals of the block moreover, are entirely enclosed to protect the same but are readily accessible for making or changing connections.

In order that the invention may be more fully understood, reference will be had to the accompanying drawings wherein:

Figure 2 is a rear perspective view of the cabinet containing the switchboard equipment and the section of distributing frame associated therewith;

Figure 3 is a sectional view of one of the jack panel units employed in the switchboard;

Figure 4 is a side elevation of the jack panel unit;

Figure 5 is a fragmentary view of the front of the switchboard showing two panel units attached thereto;

Figure 6 is a perspective view of a key employed to operate the switchboard pin jacks;

Figures 7 and 8 are continuation views of a circuit diagram involving a complete vertical row of jacks appearing at the switchboard, their line circuits, signal circuits and potential distributing equipment;

Figure 13 is a circuit diagram of the main line signal system applied to a number of switchboard circuits; and, Figure 14 is a diagramatic view of one form of telegraph switchboard circuit heretofore employed, included for purpose of comparison.

Figure 1:
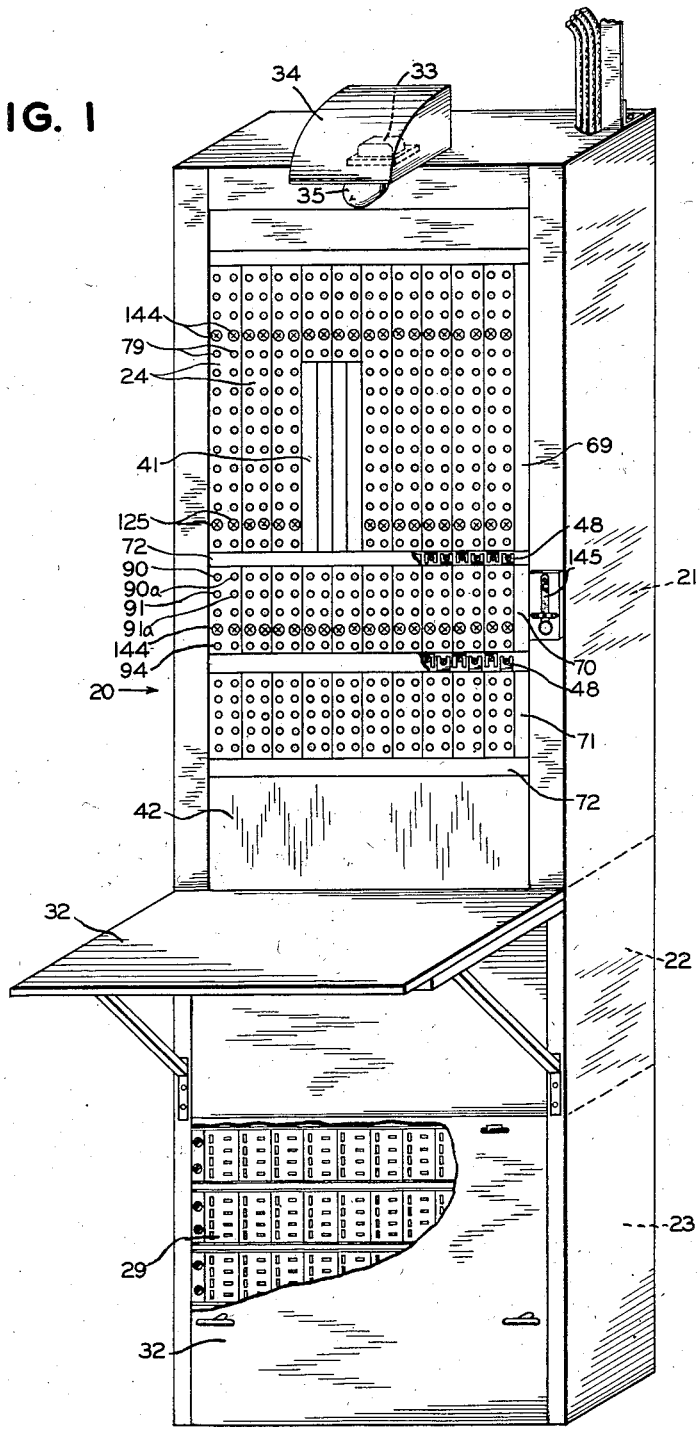
Figure 1 is a front perspective view of a switchboard section constructed in accordance with the present invention.

Referring first to Figures 1 and 2, each switchboard section comprises a cabinet 20 having three compartments 21, 22 and 23 disposed one above the other. The upper compartment 21 is closed at the front by a number of closely abutting jack panel units 24 and contains the pin jacks 25 (Figure 9) and jack circuit connections. Access to the jacks at the back of the panel units is had by double doors 26 at the rear of the jack compartment. The middle compartment 22 houses a group of relays 27 (Figure 10) which control the faulty line and call signal circuits. Access to the relays 27 is had by a door 28 at the rear of the cabinet. The lower compartment 23 contains the potential distributing blocks 29, fuses 30, and ground punchings 31 and is provided with a removable door or panel 32 at the front of the cabinet. The cabinet is provided with a shelf upon which the wire chief's test apparatus, not shown, may be disposed. A buzzer or other audible signal 33, its containing resonator 34 and a sectional signal lamp 35 are provided at the top of the switchboard cabinet.

The horizontal portion 36 of the distributing frame, corresponding to a particular section of the switchboard, is built up of angle and strap iron, as shown in Figure 2, and is provided with a number of horizontal shelves 37.

The distributing frame section 36 is of substantially the same width as the cabinet 20 and is secured in spaced relation thereto by a cross brace 38. A number of terminal blocks 39 are mounted on the forward ends on the brackets 37 and all of the wires extending between a particular switchboard section and the distributing frame are cabled, as shown at 40, and terminate at the terminal blocks 39 where they are fanned to the terminal strip lugs, not shown, carried by the terminal blocks.

The cabinet 20 and the distributing frame section 36 constitute a unit which may be completely assembled and the internal switchboard wiring and external cabling to the horizontal portion of the distributing frame installed in the shop prior to the installation of the unit upon the floor of the switchboard room. The units may then be assembled side-by-side in a single row containing up to one hundred or more units depending upon the switchboard facilities required, it being only necessary to make the potential or battery connections to the switchboard sections and to make the cross or jumper connections between the terminal blocks 39 and similar blocks disposed on the vertical side of the frame (not shown).

The switchboard panel is composed of the number of panel units 24, vertical panel fillers 41 and horizontal fillers 42. Each of the panel units 24 carries two vertical rows of jacks and provides facilities for two complete switchboard circuits. As shown in Figures 3, 4, and 5, each panel unit comprises a pair of insulating panel strips 43 and 44 secured to each side of a central plate 45 by means of bolts 46. The plate 45 extends rearwardly of the panel strips and its upper and lower ends are offset as indicated by the numeral 47 to opposite sides of the plate, each of the offset portions being provided with a vertical lug 48, slotted to receive a screw for attachment of the unit to the switchboard frame.

A number of jacks 25 are secured to the plate 45 by bolts 49 passing through the jack assembly and through apertures 50 in the supporting plate. The sleeve contacts of the jacks rest upon a seat 51 extending rearwardly from the insulating panel strips 43 and 44 and each of the panel strips is provided with a vertical row of openings 52 in alignment with the jacks, for the reception of a patching cord plug or a switch key.

The jacks 25 may comprise a sleeve spring 53, sleeve normal spring 54, a tip spring 55, a tip normal contact 56, and an extra contact 57 intermediate the sleeve and sleeve normal springs. The jack contacts are separated by insulating spacers 58 and are rigidly secured together by tubular rivets 59 passing through the contact springs and insulating members and insulated therefrom by non-conducting sleeves 60.

The bolts 49 by which two of the jacks are assembled back-to-back on each side of the central plate 45 pass through the rivets 59 and through insulating spacers 61 having bosses 62 disposed in the apertures 50 of the plate so as to center the bolts therein and definitely locate the jacks with respect to the panel strips. The jacks are constructed so as to operate either as a jack or as a switch. When employed as a switch, a key 62' is inserted in the panel opening and in the position shown in reference to the lower jack in Figure 3 permits the jack contacts to remain closed. If it is desired to open the jack contacts the key is rotated to the reverse position shown with reference to the upper jack in Figure 3 thus causing the tip and sleeve springs to part from their normal contacts.

The construction of the key 62' is shown in perspective in Figure 6 and comprises an operating handle or knob 63, a cylindrical portion 64 part of which is cut away to produce the intermediate portion 65, and a rectangular tip portion 66 joined to the intermediate portion by the inclined part 67. When the key 62 is inserted in the jack in the normal position shown with reference to the lower jack of Figure 3, the intermediate portion 65 of the key rests within the arcuate extension of the opening 52, formed in the seat 51 and the end of the sleeve spring 53 rests in its normal position on the seat 51.

A differential spring pressure is provided between the sleeve and sleeve normal contacts of the jack so as to cause the sleeve normal contact to follow the sleeve contact until it engages the extra contact 57. The sleeve normal spring is, therefore, always in engagement with one of the jack contacts.

The construction of the jack is more particularly described and shown in a co-pending application, Serial No. 469,112 filed July 19, 1930, and entitled "Switchboard jacks", now Patent No. 1,880,824, granted Oct. 4, 1932.

The jack compartment 21 of the cabinet is provided at the front with a number of horizontal bars 68 extending across the face thereof to which the panel units are secured by means of the offset lugs 48. In the particular embodiment shown, three horizontal rows 69, 70 and 71 (Figure 1) of panel units are shown, the panel units of row 69 having fifteen jacks in vertical alignment and the panel units of rows 70 and 71 each having 5 jacks in vertical alignment. It will be noted that the lugs at the top and bottom of the intermediate horizontal row 70 alternate with the lugs at the bottom and top of the adjacent panel units of rows 69 and 71 respectively, thus providing a compact construction. The lugs 48 are covered by narrow panel fillers 72 sprung into place. The vertical filler panels 41 are employed when a particular switchboard circuit requires a less number of jacks than the adjacent switchboard circuits.

Card holders 73 (Figure 5) are provided between the jack openings 52.

The jacks in each vertical row of a particular panel unit constitute the switchboard outlets of one complete switchboard circuit. The complete circuit connections of the jacks comprising a complete vertical row as shown in Figure 1 extending over three panel units is shown in Figures 7 and 8.

The group of jacks numbered 75 to 89 are mounted upon a single panel unit of appropriate length and with their circuit connections constitute one complete main line switchboard circuit for a single current line. Jacks 90 to 94 are mounted upon another panel unit and provide trunking and looping facilities and facilities for miscellaneous circuits not normally assigned to any main line circuit. The group of jacks 95 to 99 are mounted upon a third panel unit and with their circuits comprise a main line switchboard circuit for a duplex line.

Figure 8:
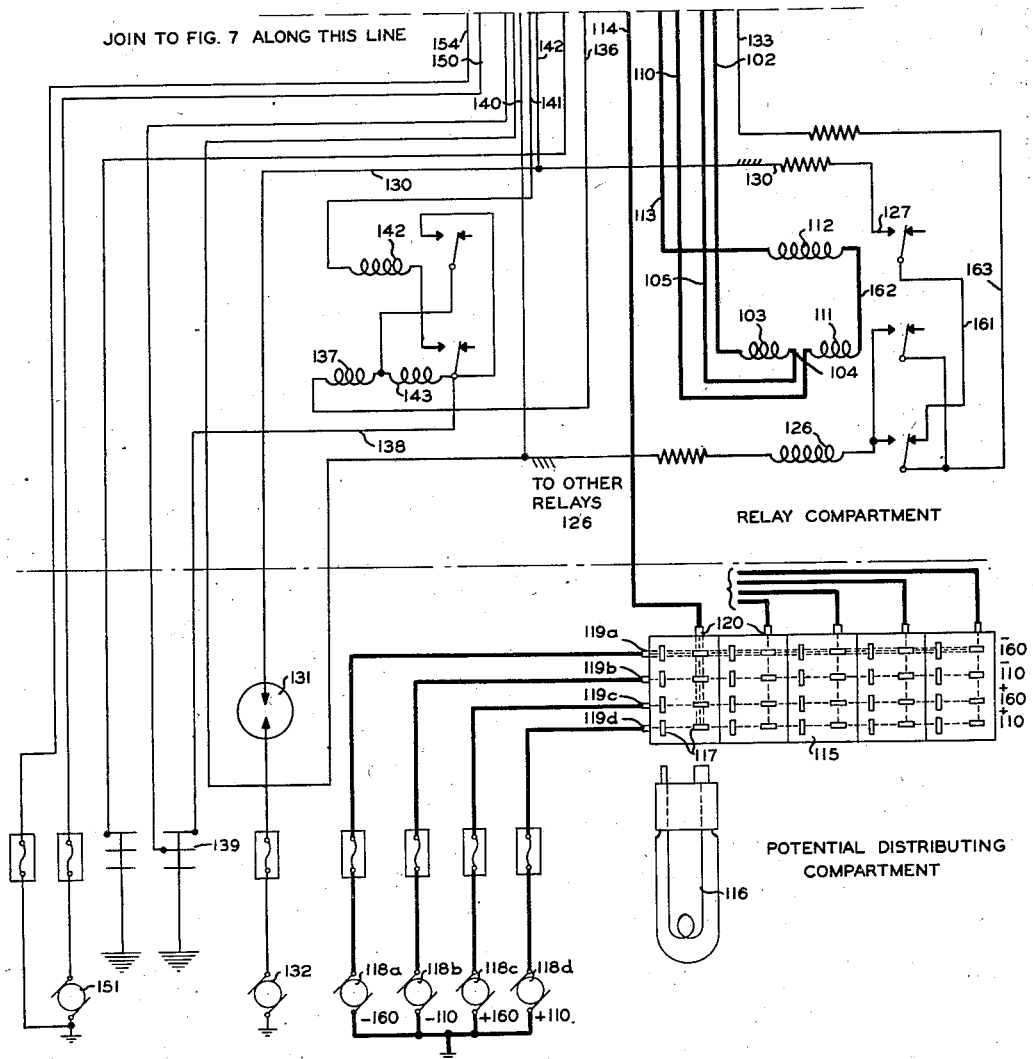

By reference to Figures 7 and 8 the main line circuit involving jacks 75 to 89 may be traced from the terminal block, diagramatically represented at 39a, through which the incoming main line is extended by a cabled conductor 101, to the tip and tip normal contacts of the line jack 86, line patching jack 85, wire chief's jack 89, and anti-induction jack 87, and thence by conductor 102 to one winding 103 of a differential relay 104. The circuit continues by conductor 105 to the tip normal and tip springs of a loop jack 82, thence through cable 106 to terminal block 39d, through the loop (not shown) and back to the same terminal block and by cable 107 to the sleeve and sleeve normal springs of the same loop jack 82. The circuit then continues in a similar manner through the loop jack 81 and terminal block 39c back to the sleeve and sleeve normal springs of jack 81 and thence to the extra contact 57 and sleeve normal contact, of loop jack 80 and by conductor 108 to the tip spring of looping jack 84, thence through the cord circuit of the double conductor plug inserted in the jack 84 and back by way of the sleeve contact of the jack to conductor 110 by which the circuit is extended to the opposite winding 111 of the differential relay 104. The circuit continues from this point through the winding of the faulty line signal relay 112, conductor 113 to the tip and tip normal contacts of the battery patching jack 77 and battery jack 75, thence by conductor 114 to a potential distributing block 115. The block 115 provides facilities, through insertion of a resistance lamp 116 in suitable apertures 117 of the block, to connect the conductor 114 to any desired one of a number of grounded generators 118a, 118b, 118c and 118d arranged to supply different polarities and potentials.

The construction of the potential distributing block is fully described in a copending application, Serial No. 469,129, filed July 19, 1930, and entitled "Potential distributing block." Briefly it consists of four longitudinally extending bus bars 119a, 119b, 119c and 119d and a number of cross bus bars 120 insulated therefrom. An insulating cover extends over the bus bars having the apertures 117 through which the prongs of the resistance lamps 116 extend into spring clips (not shown) provided on the bus bars immediately beneath each of the openings. The lamp serves the double purpose of connecting the conductor 114 with the desired potential and inserting a current limiting or protective resistance in the circuit.

It will be noted that the loop jacks 80, 81 and 82 have keys 62' inserted therein, the keys of jacks 81 and 82 being positioned so as not to interfere with the normally closed condition of the jacks. In the closed position of the jacks the line circuit is normally extended through the loops whereas in the reversed position of the key, as shown in jack 80, the loop circuit is short circuited through the extra spring 57 and sleeve normal contact of the jack. The normal loop assignments of the line may, therefore, be completed or shunted without the use of patching cords as has been necessary in prior telegraph switchboard construction and the present board may, therefore, be termed a cordless switchboard.

We have shown in Figure 14, for the purpose of comparison, the usual method heretofore employed for making normal loop assignments. Individual looping jacks 121 are provided in conjunction with each loop jack 122, the loops normally being shunted out of the circuit through the tip and tip normal springs of the looping jacks and can be cut into the line only by inserting a short double conductor patching cord 123 between the looping and loop jacks.

The construction of the present invention eliminates the use of the looping jacks 121 and patching cords for all normal line assignments, thus reducing the number of jacks appearing on the board and eliminating the unsightly appearance of the patching cords and the dangers, incidental to their use, of accidental or inadvertent misplacement or removal of the patching cords. The construction at the same time permits patching cords to be employed when necessary to make temporary or unusual assignments through the looping jacks 84, and any loops associated with jacks 80, 81 and 82 may be disconnected from the line jack 86 and transferred to another part of the board by a patching cord plugged into the loop jack, the plug acting similarly to the key in the position shown in jack 80. This construction permits great flexibility in making and changing circuit assignments with a minimum number of jacks and a minimum use of patching cords.

Each of the jacks 88 has a small signal lamp 125 which is disposed immediately above the wire chief's jack and which is controlled through the differential relay 104 and faulty line relay 112 to indicate, for each particular line circuit, either a call signal originating at an operator's position on one of the loops connected to the line circuit or a faulty line condition, such as a ground. The contacts of differential relay 104 are arranged to supply a steady current to the lamp 125 and those of faulty line relay 112, to supply an intermittent current. A locking relay 126 is also provided for each switchboard circuit.

In the normal operation of the circuit the battery supplied from the potential distributing block 115 passes through the faulty line relay 112, winding 111 of the differential relay, loops associated with the loop jacks 82 and 81 and back to the winding 103 of the differential relay and thence to the line through conductor 101. The normal current flow through the relay 112 is insufficient to operate the same and the current through each of the windings of the differential relay 104 is equal and of opposite direction so that the armatures of both of these relays remain on their back contacts. The circuit of the signal lamp 125 thus remains open at the relay contacts. When an operator, at one of the loop circuits, desires to call the attendant at the switchboard, she grounds the lamp circuit through a suitable resistance, by means of a manual key, not shown, thus causing the current in one winding 103 of the differential relay to fall off thereby disturbing the balance of the relay and causing its armature to pull up. The resistance of this grounded circuit is such as to maintain the intensity of current in the relay 112 substantially constant so that the relay is not affected by the call signal. Differential relay 104 upon operating completes one signal circuit for the lamp 125 as will presently appear to cause a steady operation thereof.

If a faulty line condition, such as a ground, occurs on the main line this causes an increase in the current flow through the windings of the differential relay and faulty line relay. Since this current is balanced in the differential relay it does not respond but the faulty line relay operates in response to the increased current and completes another circuit for the lamp 125 to cause an intermittent operation thereof.

In Figure 13 the signal system is shown in connection with three switchboard circuits terminating at the same section, all of the jacks being omitted for convenience of illustration, excepting the loop jack 82, line jack 86, signal lamp 125, and wire chief's jack 89.

The back contact of faulty line relay 112 is unconnected and the front contact 127 thereof is connected by a conductor 130 in multiple with the front contacts of the corresponding relays of each of the other switchboard circuits, to one terminal of a current interrupter or intermittent make and break device 131, the opposite terminal of which is connected to a grounded source of potential 132. The front contact of differential relay 104 is connected to one terminal of the locking relay 126, the opposite terminal of which is connected in multiple with the relay 126 of each of the other switchboard circuits, to the source of potential 132. The back contact of relay 126 is connected to the tongue of relay 112 and the front contact is also connected to the winding of relay 126. The tongues of relays 104 and 126 are joined by a conductor 133 to the upper contact spring of the lamp jack 88, the lower spring of the lamp jack being connected to the spring contacts 134 of the wire chief's jack 89 and thence, from contact 135 thereof, by conductor 136, in multiple with the corresponding contacts of each of the other wire chief's jacks, to one end of the winding of a section relay 137 the opposite end of which is connected by a conductor 138 through the ground punching 139. Relay 137 controls the operation of the section buzzer 33 and section lamp 35 each time one of the small switchboard circuit signal lamps 125 operates, to notify the wire chief or switchboard attendant of the call should he be at another section of the switchboard.

The buzzer 33 has one terminal connected to the source of current 132 by a conductor 140, the other terminal being connected in common with one terminal of the lamp 135 by a conductor 141 to one end of the winding of relay 142 and thence to the front contact of relay 137. The function of relay 142 is to cause a large portion of the windings of the section relay 137 to be short circuited through the tongue and front contacts of the relay 142. The tongue of relay 137 is connected to the ground through the conductor 138. The lamp 35 has the other terminal connected to the circuit interrupter 131 by conductor 142.

The operation of the call signal, in response to the actuation of differential relay 104, as a result of the grounding of the loop circuit at one of the operating positions is as follows:

The circuit is completed from the source of potential 132 through the winding of the locking relay 126, contacts of relay 104 and conductor 133 to the lamp 125 thence through spring contacts 134 and 135 of the wire chief's jack 89 to the grounded winding of the section relay 137. Lamp 125 is thus caused to glow. Relay 126 picks up at this time and completes a holding circuit for the lamp through the front contact thereof. At the same time section relay 137 operates to apply the ground 139 through the front contact thereof and winding of relay 142 to the buzzer 33 and section signal lamp 35, thus causing the buzzer to operate continuously and the signal lamp 35 to operate intermittently through the action of the current interrupter 131. Upon completion of these circuits relay 142 operates to by-pass the portion 143 of the windings of the relay 137, the remaining turns being sufficient to maintain the relay operated.

The signal lamp 125, buzzer 33, and section lamp 35 continue to operate until the switchboard attendant answers the call by inserting a cord plug in the wire chief's jack 89, thus interrupting the locking circuit or relay 126 and restoring the system to normal.

If a faulty line condition causes the operation of the faulty line relay 112, a circuit is completed from the source of potential 132 through the circuit interrupting device 131, front contact 127 of relay 112, back contact of relay 126 and conductor 133 to the lamp 125, and thence through the contacts of the wire chief's jack 89 to the grounded winding of the relay 137. The lamp 125 is thus caused to glow intermittently through the action of the circuit interrupter 131. Since the relay 137 is directly in the lamp circuit its contact tongue oscillates back and forth to apply ground intermittently to the circuits for the buzzer 33 and section lamp 35, thus causing these signal devices to operate intermittently. All the signal devices continue to operate in this manner until their circuits are interrupted by the insertion of a plug in the wire chief's jack.

It will be noted that the lamp 125 and the buzzer 33 operate steadily in response to a call signal and intermittently in response to a faulty line condition. Section lamp 35 is caused to glow intermittently in response to both call signals and faulty line conditions but it is to be understood that the lamp 35 may be caused to glow steadily in response to a call signal, if desired, by applying the battery 132 directly thereto instead of through the circuit interrupter 131.

The call signal and faulty line signal system is more fully described in a copending application, Serial No. 467,343 filed July 11, 1930, and entitled "Switchboad signal system", now Patent No. 1,814,931, granted July 14, 1931.

It was stated above that jacks 75 to 89 with their associated circuits comprise one switchboard circuit. Jacks 78 and 79, however, are not strictly a part of the switchboard circuit but provide trunk signal and trunking facilities for the entire switchboard section. The jacks 79 form a horizontal row across the switchboard section and are connected to individual trunk lines having multiple jacks appearing at each of the other sections or each alternate section. A second row of trunk jacks are provided corresponding to jack 94. Trunk lines enable any circuit in the section to be transferred or extended to a circuit appearing at any other section by connecting suitable patching cords between the trunk jacks and the jacks associated with the circuits to be connected.

In order to avoid interference with other circuits, it is necessary to determine whether the trunk to be employed is already in use at some other portion of the board before making a connection thereto. For this purpose, busy test knobs have been provided, heretofore, adjacent each trunk line jack so connected that the insertion of a plug in any trunk line jack grounds all the busy test knobs on that particular trunk. Before using a trunk line, the switchboard attendant had to tap the busy test knob of each jack with a test plug until he located one which was not in use, as determined by the absence of a click of his test sounder. If the sounder clicked when the test knob was tapped, it indicated that the trunk was in use and another trunk had to be selected and the test repeated until an idle trunk line was located.

According to the arrangement of the present invention a small signal lamp 144 is provided in the jacks 78 and 93 immediately above the trunk line jacks and these lamps are provided with control circuits so that upon closing of a manual switch 145 provided at each switchboard section all of the lamps at that particular section associated with a busy trunk line are operated, thus visibly indicating which trunk lines are busy and which are idle, and hence available for use.

The trunk line jack 79 has its sleeve contact connected to one trunk line 146 and its tip contact connected to a second trunk line 147 which extends across the entire switchboard and has a corresponding trunk jack appearing at each switchboard section whereby any trunk line may be connected to any circuit jack on the entire board by means of short lengths of patching cord. The contact spring 148 is strapped to the lower spring of signal lamp jack 78 and the contact spring 149 is connected by a conductor 150 to a source of potential 151. The upper contact of the lamp jack 78 is connected by a conductor 152 to one contact of a multi-contact switch 153 disposed at each section and to which the corresponding contacts of all of the lamp jacks at that particular section are connected. All of the contacts of switch 153 are arranged so as to be connected to a common return wire 154, upon operation of the switch, which wire is joined to the opposite side of the source of potential 151.

The multi-contact switch is operated by a magnet 155 controlled by the manual switch or key 145 located at the front of the switchboard section.

Upon the insertion of patching cord plug in the trunk jack 79, contact springs 148 and 149 are closed, thus completing a circuit to one side of the lamp 144 from the generator 151. The contact 148 of the trunk jack is multipled by conductor 156 to the corresponding spring of each of the other jacks associated with the particular trunk lines 146 and 147 so that the insertion of a plug in any of the trunk jacks of these particular trunk lines prepares the circuit to every signal lamp associated therewith. When the switchboard attendant desires to determine which lines are busy, it is only necessary to close the manual switch 145, thus causing the multi-contact switch 153 to operate and complete the circuit to all of the lamps at a particular section associated with busy trunk lines.

The busy trunk line signal system is more fully set forth in a copending application, Serial No. 469,130, filed July 19, 1930 and entitled "Busy trunk line signal system", now Patent No. 1,814,-899, granted July 14, 1931.

All of the circuits so far described have been associated with the vertical group of jacks numbered 75 to 89, two of such switchboard circuits being mounted in two vertical rows upon a single panel unit. These circuits involve a large number of strap wires inter-connecting the springs of the different jacks, the particular circuit shown in Figure 7 employing fourteen such strappings and involving twenty-eight soldered connections, all of which may be completed on the bench before the panel unit is mounted upon the switchboard frame.

Reference will now be had to the next row of panel units 70 which support a somewhat miscellaneous group of jacks 90 to 94. Jacks 90 and 91 are associated with jacks 90a and 91a of the next adjacent vertical row, in such manner as to provide series looping facilities.

The cross connections between this quadruple grouping is such that upon insertion of a double conductor cord plug in jack 90a, extending for instance from the loop jack 84, the tip circuit is completed through the tip and tip normal springs of jacks 90, 91 and 91a in series, back to the sleeve contact of the jack 90a and upon insertion of a double conductor cord plug into any of the jacks 90, 91 or 91a, the loop circuit may be extended to any other desired loops. Jacks 90, 91, 90a and 91a are all mounted upon the same panel unit (Figure 1) and the cross connections therebetween may thus be made before mounting the panel unit on the switchboard frame.

Jack 92 provides facilities for connecting miscellaneous loop circuits to the board not normally assigned to any definite main line switchboard circuit, and jacks 93 and 94 provide additional signal and trunking facilities.

The lower panel units 71 each includes two vertical rows of jacks numbered 95 to 99, each vertical row being associated with a duplexed line switchboard circuit, in which the battery is not applied at the board but at a pole changer controlled by the transmitting operator. The specific circuit connections employed for these circuits are not involved in the present invention and therefore need not be traced, it being sufficient to note that each of the jacks 95, 97 and 98 have cabled connections to the terminal blocks 39f, 39g, and 39h, respectively.

Figure 12:
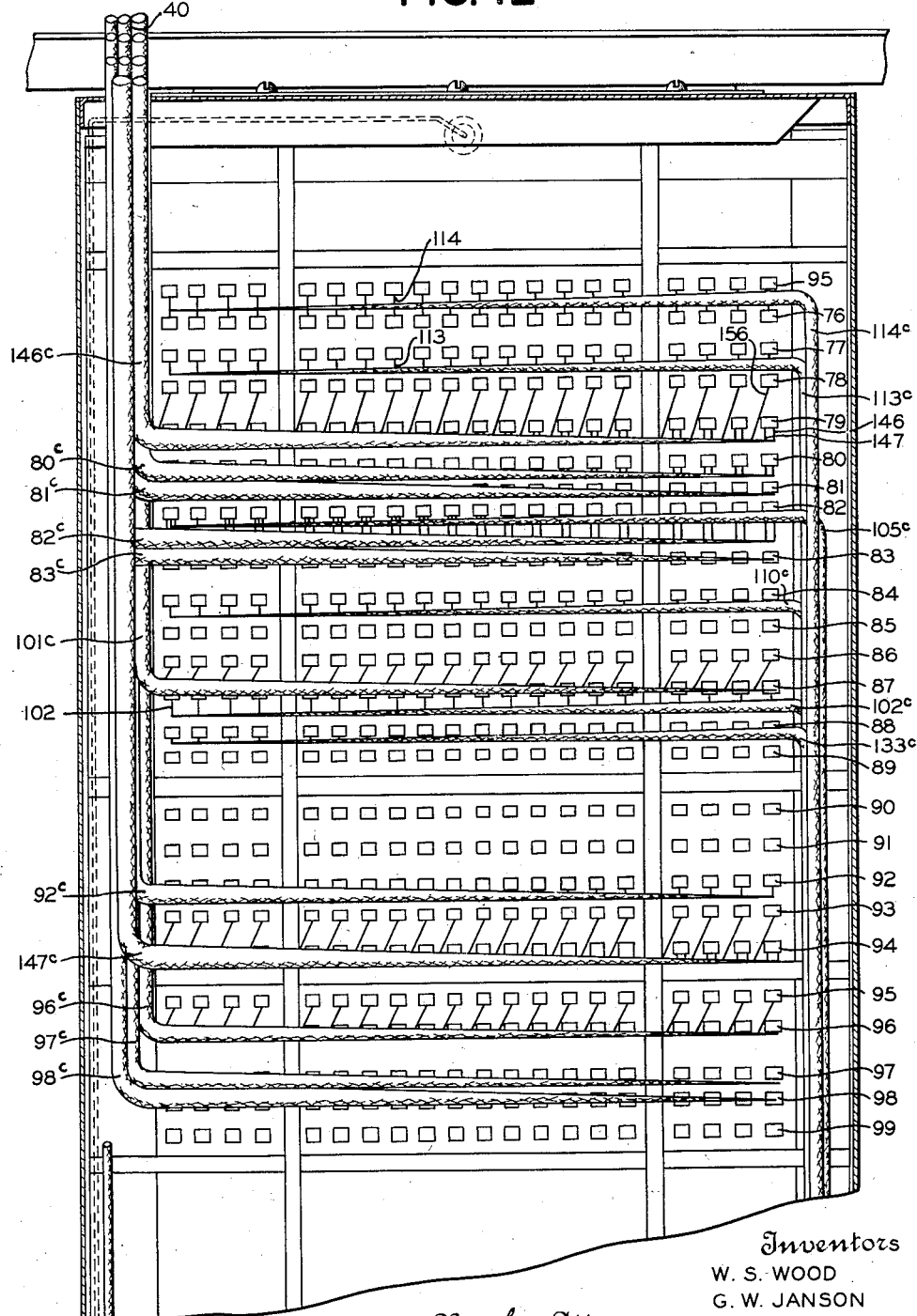
Figure 12 is a rear view of the jack compartment showing the method of cabling and fanning the jack connections.

Referring now to Figure 12 which shows a rear view somewhat diagrammatically of the switchboard panel and assembly, the small squares represent the rear of the pin jacks. It will be noted that all of the group 40 of cables extending from the distributing frame to the switchboard enter the cabinet at the top of one side thereof and extend downwardly being fanned to the horizontal rows of jacks from left to right. Similarly, all of the internal cabling between the pin jacks and the relay and potential distributing apparatus extend upwardly into the jack compartment at the opposite side of the cabinet and are fanned to the horizontal rows of jacks from right to left. The cables have in each instance been numbered to correspond with the numerals given to the single conductors shown in Figure 7 of which the cables are composed or the jacks at which they terminate with the prefix "c" attached.

Figure 9:
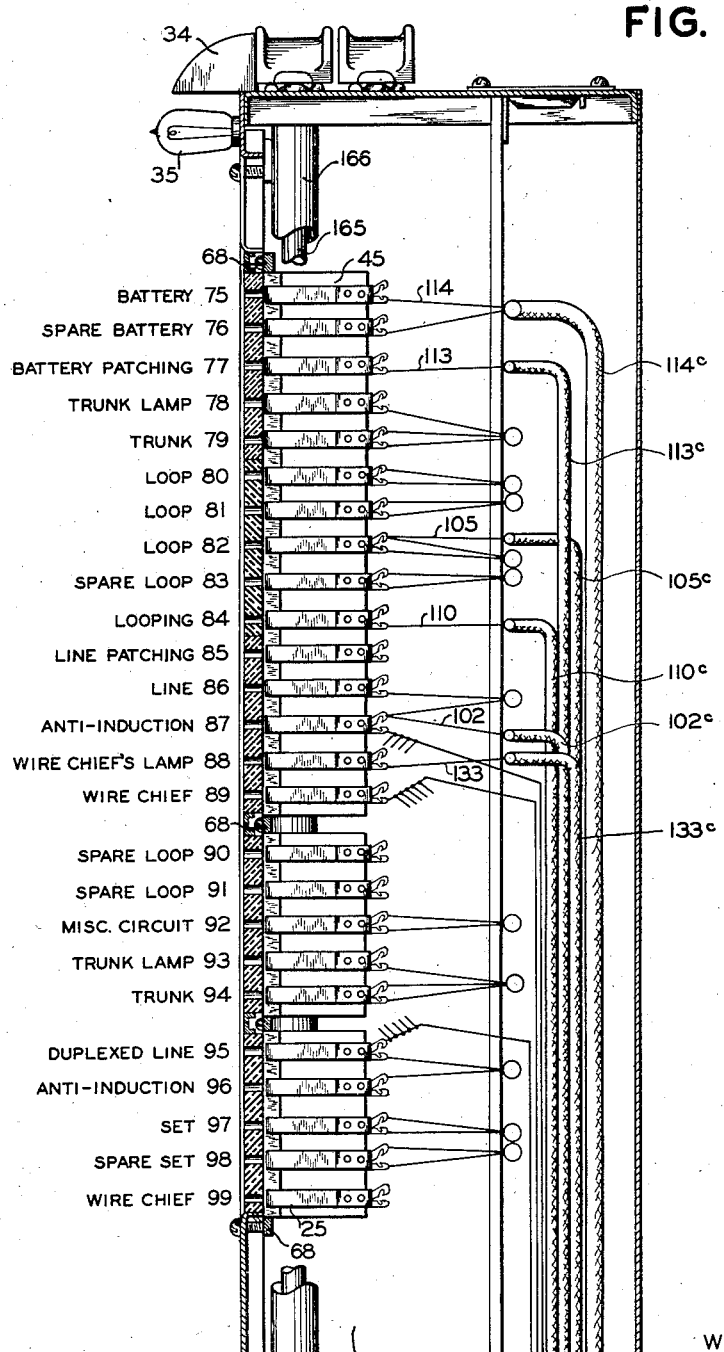
Figures 9 and 10 are continuation views of a vertical section of the switchboard.
Figure 10:
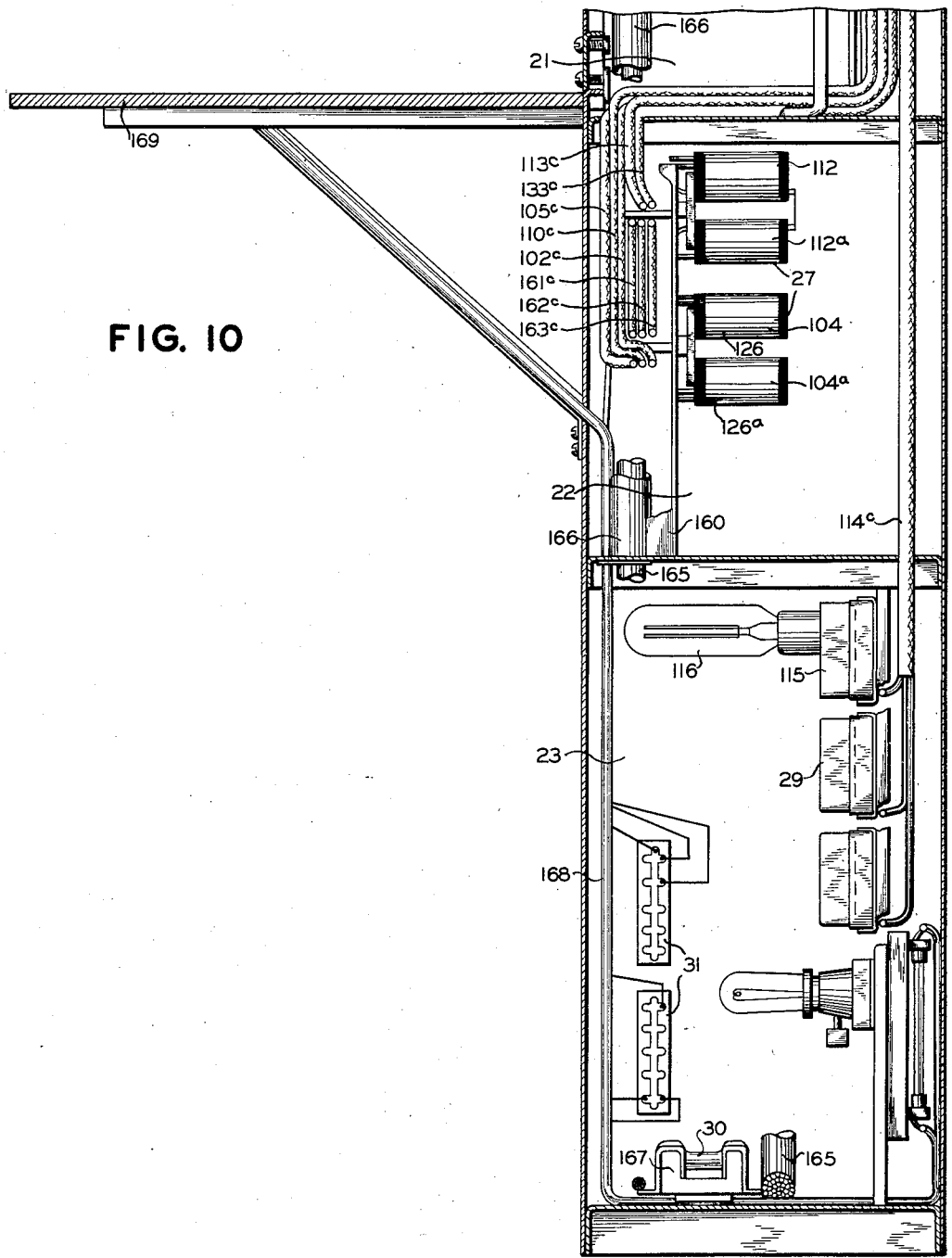
Figure 11:
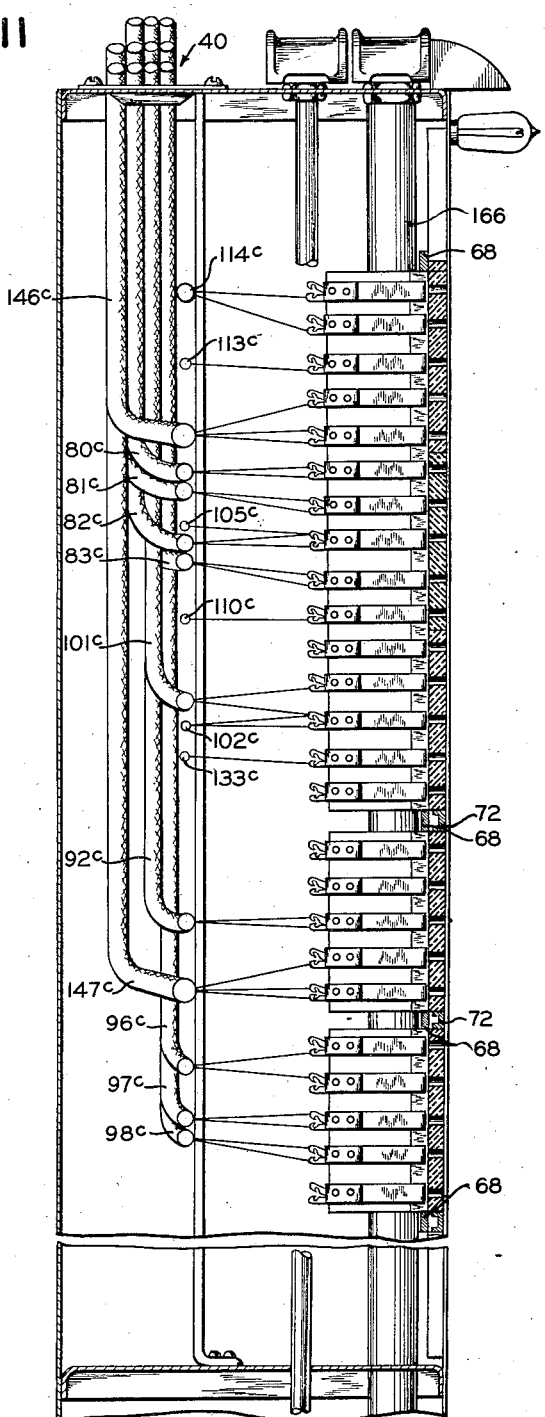
Figure 11 is a vertical sectional view of the jack compartment from the opposite side of the cabinet from that shown in Figure 9.

In Figures 9 and 10 a complete section of the switchboard cabinet is illustrated showing the manner in which the internal cables 114c, 113c, 105c, 110c, 102c and 133c are grouped, battery cable 114c extending downwardly through the relay compartment into the potential distributing compartment 23 and the remaining cables extending into the relay compartment and being fanned horizontally to the relays 112 and 104. Relays 112 and 104 are supported upon a bracket 160 and extend across the relay compartment in horizontal rows. A group of cables 161c, 162c and 163c corresponding to the conductors 161, 162 and 163 of Figure 8, cross connect the windings and contacts of the signal relays. Figure 11 shows a section of the opposite side of the switchboard compartment illustrating the manner of grouping and extending the external cables out of the cabinet.

All of the potential and ground connections are cabled at 165 and enter the cabinet at the top, extending downwardly in the metal conduit 166, through the jack and relay compartments, into the potential distributing compartment so as to be completely isolated from the relay and jack compartments. The potential connections are fanned at the base of the potential compartment to the contacts of the fuse blocks 167 from which they may be distributed to the potential distributing block 115, local and line ground punchings 31 and by cable 168 to the wire chief's test apparatus located on the shelf 169, and to the relays and signal lamps.

It will be noted therefore, that the switchboard cabinet construction is such that the protective devices and potential distributing apparatus is grouped together and isolated from the other switchboard equipment and that the control relay equipment is similarly grouped and that both the internal and external switchboard connections are made by cabled conductors all of which may be installed in each switchboard section and distributing frame section in the shop. Furthermore, the switchboard circuit arrangements and physical construction depart from conventional telegraph switchboard design in the construction of the pin jacks and the jack panel unit, in the elimination of patching cords for making normal loop assignments, in novel faulty line, and call signals and busy trunk line signal systems, and in the manner of making changes in potential assignments to the switchboard circuits.

We are aware that the invention may be embodied in other specific forms without departing from the spirit or essential attributes thereof and we desire the present embodiment to be considered in all respects, as illustrative and not restrictive, reference being had to the appended claims to indicate the scope of the invention.

What we claim is:

1. A pin jack switchboard comprising a cabinet, a plurality of compartments therein, a jack panel closing one of said compartments, a plurality of pin jacks disposed therein, switchboard circuits and signal circuits associated with said jacks, a plurality of control devices for said circuit, said devices being grouped together and enclosed within a second compartment, and potential distributing means for said switchboard and signal circuits, said potential distributing means being enclosed within a third compartment.

2. A pin jack switchboard comprising a cabinet, a plurality of compartments therein, a jack panel closing one of said compartments, a plurality of pin jacks disposed therein, switchboard circuits and signal circuits associated with said jacks, a plurality of control relays for said circuit, said relays being grouped together, cabled conductors extending between said pin jacks and said relays, and potential distributing means for said switchboard and signal circuits, said potential distributing means being enclosed within a separate compartment of said switchboard cabinet.

3. A switchboard cabinet comprising a jack compartment, a relay compartment, and a potential distributing compartment, protective devices in said potential distributing compartment, a conduit extending through said jack and relay compartments into said potential distributing compartment, power supply conductors extending into said cabinet through said conduit and terminating at one side of said protective devices, and conductors extending from the opposite side at said protective devices into said relay and jack compartments.

4. A switchboard cabinet comprising a jack compartment, a relay compartment, and a potential distributing compartment, protective devices in said potential distributing compartment, power supply conductors extending into said potential distributing compartment and terminating at one side of said protective devices, said conductors being isolated from said jack compartment, a potential distributing block in said potential distributing compartment connected to the opposite side of said protective device, and conductors extending from said potential distributing blocks into said jack compartment.

5. A telegraph pin jack switchboard comprising a switchboard panel, a plurality of pin jacks mounted in groups behind said panel, a switchboard circuit for each of said groups, main line and loop circuits connected to said switchboard circuit, a signal lamp for each of said switchboard circuits and relay means included in said switchboard circuit responsive to a predetermined condition in said main line and loop circuits, for causing said signal lamps to glow in a manner indicative of the circuit in which such condition occurs.

6. A pin jack switchboard comprising a jack panel, a plurality of switchboard circuits, main line and loop circuits, connected to said switchboard circuit, a plurality of trunk lines, a group of pin jacks for each of said switchboard circuits, a jack for each of said trunk lines arranged in a group, an individual signal lamp for each switchboard circuit for indicating predetermined electrical conditions of said loop and main line circuits, and an individual signal lamp for each of said trunk jacks for indicating which of said trunk lines are in use.

7. A pin jack switchboard comprising a jack panel, a plurality of switchboard circuits, main line and loop circuits, connected to said switchboard circuit, a plurality of trunk lines, a group of pin jacks for each of said switchboard circuits, a jack for each of said trunk lines arranged in a group, an individual signal lamp for each switchboard circuit for indicating predetermined electrical conditions of said loop and main line circuits, an individual signal lamp for each of said trunk jacks for indicating which of said trunk lines are in use, a signal device common to said switchboard section, and means for operating the same simultaneously with the operation of any one of said switchboard circuit signal lamps.

8. A pin jack switchboard section comprising a jack panel, a plurality of switchboard circuits, main line and loop circuits connected to said switchboard circuits, a plurality of trunk lines, a group of pin jacks for each of said switchboard circuits, a pin jack for each of said trunk lines arranged in one or more groups, said first groups extending in parallel rows on said panel and said latter group extending along said panel in a row normal to said first rows, an individual signal lamp for each switchboard circuit for indicating predetermined electrical conditions in said main line or loop circuits, and a signal lamp for each of said trunk line jacks for indicating which of said trunk lines are in use.

9. A switchboard comprising a cabinet having a plurality of compartments, a jack panel closing one of said compartments, a plurality of pin jacks disposed therein, a switchboard circuit and signal circuit associated with said jacks, a plurality of control relays for said circuits, said relays being grouped together and enclosed within a second compartment, a distributing frame associated with said switchboard, internal conductors connecting said pin jacks and relays, and external conductors connecting said pin jacks and distributing frame, said internal conductors being cabled along one side of said cabinet and being fanned horizontally to said jacks from said side, and said external conductors being cabled along the opposite side of the cabinet and being fanned to said jacks from said opposite side.

10. A switchboard cabinet comprising a jack compartment and a potential distributing compartment, protective devices in said potential distributing compartment, power supply conductors extending thereinto and terminating at one side of said protective devices, said conductors being isolated from said jack compartment and conductors extending from the opposite side of said protective devices into said jack compartment and being connected to said jacks.

11. A switchboard comprising a jack panel, a plurality of switchboard circuits, line circuits connected to said switchboard circuits, a plurality of trunk lines terminating at said switchboard, a group of pin jacks for each switchboard circuit, a jack for each of said trunk lines, individual signal devices in each switchboard circuit for indicating predetermined electrical conditions of said line circuits and individual signal devices in each of said trunk jacks for indicating which of said trunk lines is in use.

12. A switchboard comprising a panel, a plurality of jacks mounted thereon, switchboard circuits associated with said jacks, a plurality of control devices for said circuits, said devices being grouped together and spaced apart from said jack panel, a distributing frame associated with said switchboard, internal conductors connecting said jacks and said devices and external conductors connecting said jacks and said distributing frame, said internal conductors being cabled along one side of said cabinet and being fanned horizontally to said jacks from said side and said external conductors being cabled along the opposite side of the cabinet and being fanned to said jacks from said opposite side.

WYATT S. WOOD.
GEORGE W. JANSON.
EUGENE A. DEMONET.